United States Patent Office 3,600,305
Patented Aug. 17, 1971

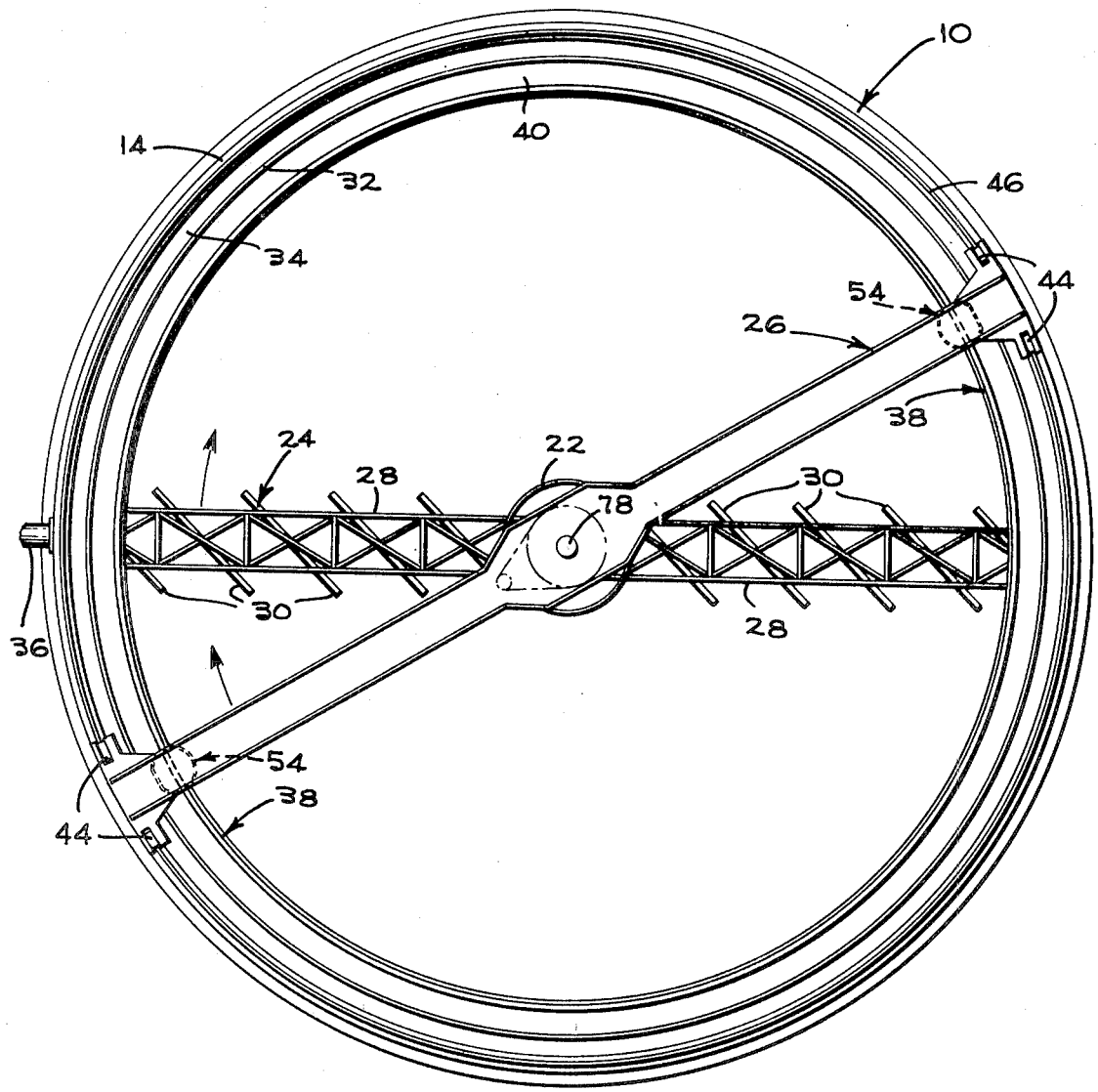

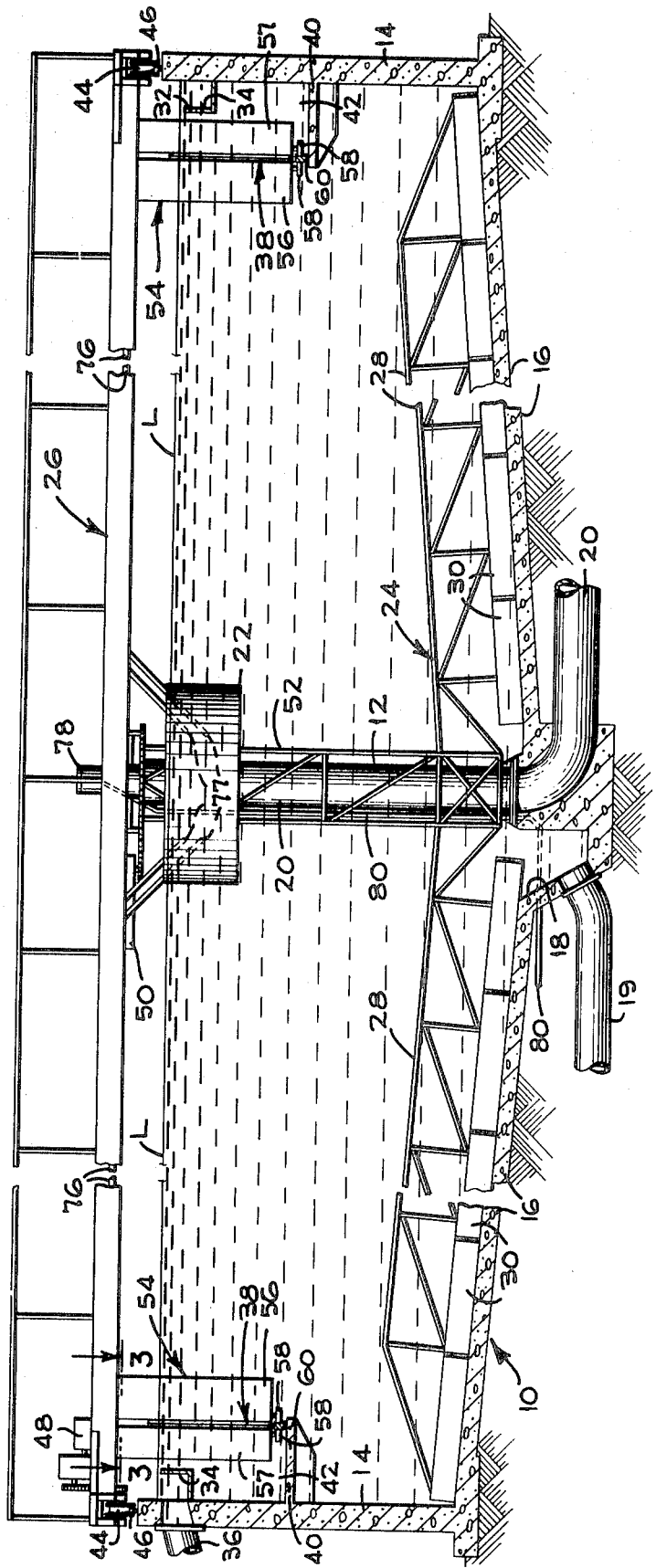

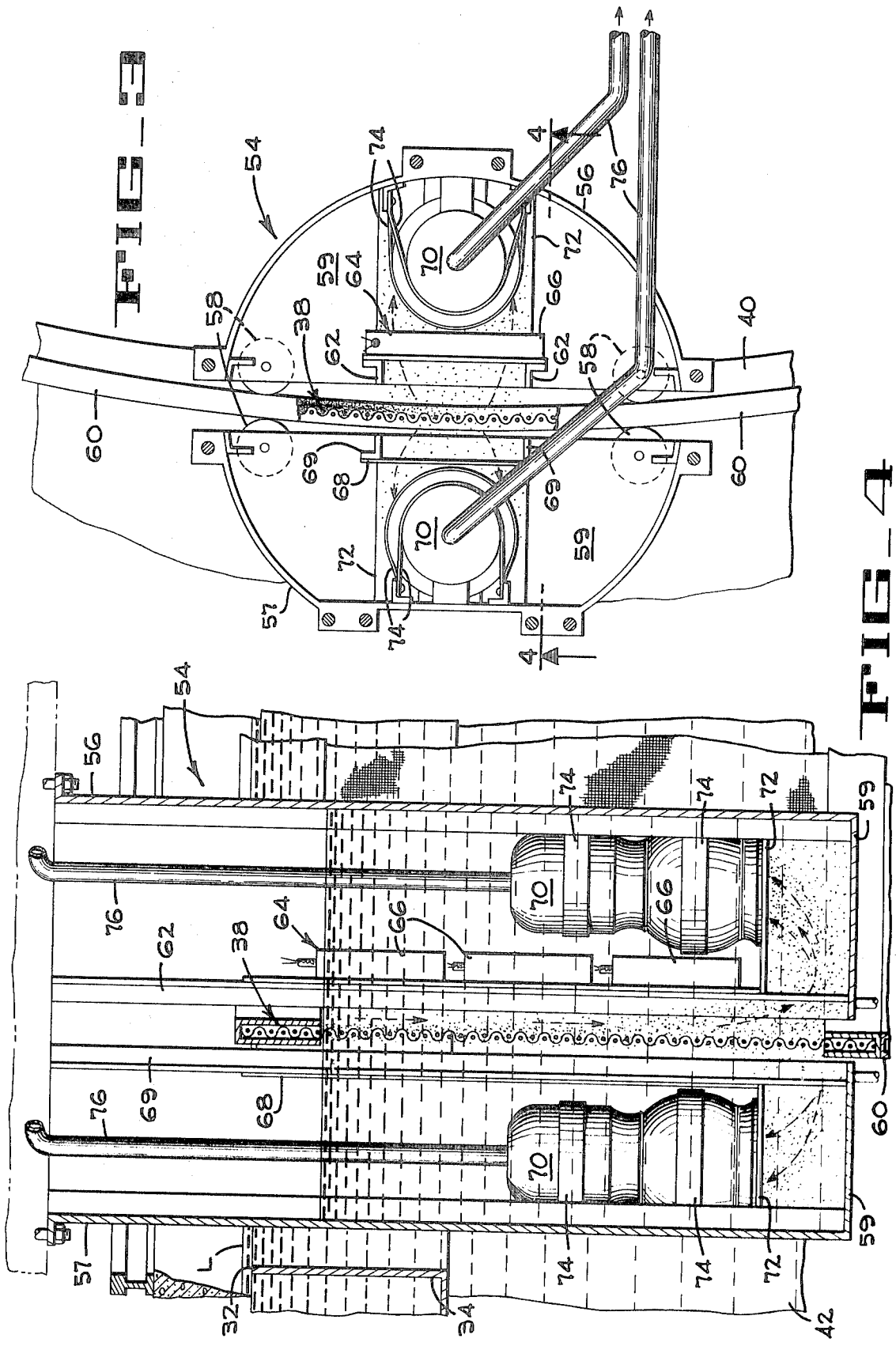

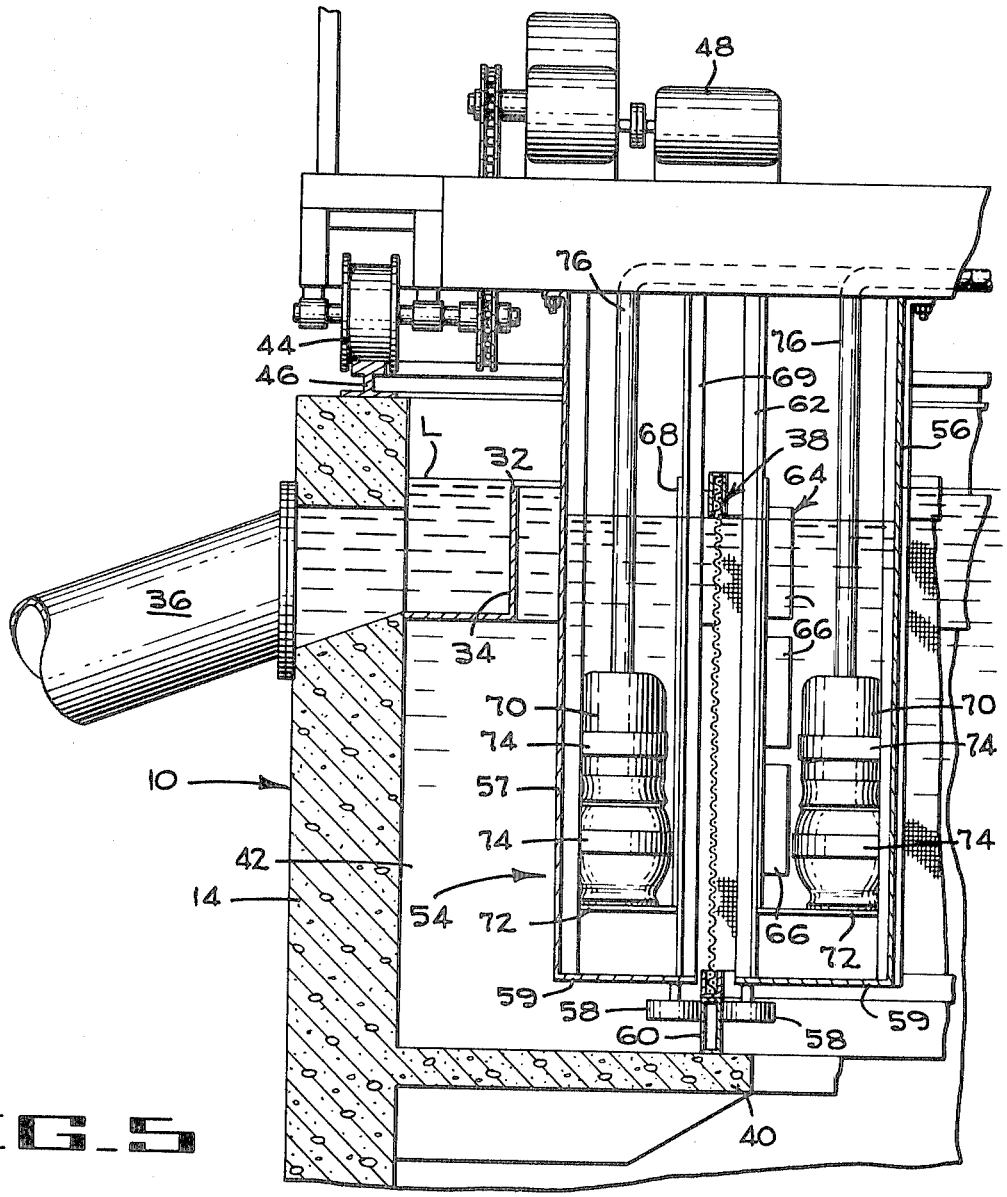
FIG_5

3,600,305
SONIC FILTER CLEANING APPARATUS AND METHOD
Philip Edgerton, Holicong, Pa., assignor to FMC Corporation, San Jose, Calif.
Filed Apr. 2, 1970, Ser. No. 25,001
Int. Cl. B01d 21/24
U.S. Cl. 210—19          13 Claims

ABSTRACT OF THE DISCLOSURE

A circular sludge clarification tank, wherein influent sludge enters the tank from a centrally located opening and clarified liquid effluent leaves the tank over an annular weir at the outer circumference of the tank, has an annular filtering screen of slightly less diameter than the collection tank which collects floating and suspended solid particles so as to prevent their exit from the tank with the clarified liquid effluent. A sonic filter cleaner containing sonic transducers and two submersible pumps, straddles the filtering screen and moves circumferentially around the tank while sonically vibrating solid particles off the screen and quickly withdrawing them from the tank with the pumps. The withdrawn solid particles, comprising a slurry of filtrate, are pumped back and introduced into the tank a second time with the influent liquid for recycling.

BACKGROUND OF THE INVENTION

Field of the invention

This invention is generally concerned with the separation of liquids and solids. One common form of an apparatus for accomplishing the same is a circular liquid clarifier. In such a clarifier the liquid, which contains solid particles in suspension, is passed through the clarifier in such a manner that most of the solids will subside to the bottom and the clarified liquid is drawn off at the top.

Not all of the solids subside to the bottom of the clarifier. The lighter solids usually remain suspended in the liquid or float on the surface. The present invention is concerned with the removal of these suspended or floating solids so that they are not drawn out of the clarifier along with the clarified liquid effluent.

The liquid effluent is generally drawn out of the clarifier over an annular weir which circumscribes the clarifier. To prevent the flow of suspended or floating solids over this weir, an annular screen filter, of slightly less diameter than the effluent weir, is utilized so that the filter picks up the solids while allowing the clarified liquid to pass through and thence over the effluent weir. With continued use, the solid particles begin to build up or cake on the filter preventing the maximum flow of clarified liquid through the filter. Therefore, means must be provided for relieving the screen of these solid particles at periodic intervals and the present invention is specifically concerned with such a device.

Description of the prior art

One type of filter cleaning apparatus is disclosed in the patent to P. M. Thayer, Re. 21,652 issued Dec. 3, 1940. There the annular filter of a sewage settling tank is disposed horizontally so that liquid flow is upwardly through the filter. A submersible fluid pump is driven annularly around the tank so as to always be slightly spaced above the filter and draws clear liquid from above the filter and pumps it back down through a nozzle and through the filter to wash the solid particles, which have collected on the bottom of the filter, downwardly into the settling tank.

Another type of filter cleaning apparatus is shown in the M. M. Cannon et al. 2,975,899 patent issued Mar. 21, 1961. In this apparatus two concentric annular filtering screens are disposed vertically so that influent, solid-laden liquid can pass therebetween with the heavier solids falling to the bottom of the channel bounded by the two screens. The clarified liquid effluent passes through the screen filters depositing the lighter solids on the screen. To remove the solids from the screens, inner and outer foils are rotated closely adjacent the vertical screens and within the confined channel. The movement of the foils creates a low pressure zone on the face of the screens which, along with the turbulence accompanying the low pressure, facilitates removal of the solids deposited on the screen.

Other but less pertinent filter cleaning apparatuses are disclosed in the patents to C. Lose, Jr., 2,224,191 issued Dec. 10, 1940 and I. J. Clarke-Pounder 3,363,759, issued Jan. 16, 1968.

SUMMARY OF THE INVENTION

The present invention is adapted for use in circular clarification tanks which are used in the treatment of sewage, however, the principles of the invention would be equally applicable in any type of clarification system wherein a filtering medium was utilized. The circular clarification tank for which the invention is best suited has a vertical hollow center column through which liquid to be clarified enters the tank and from which it is discharged through ports near the upper terminus thereof. The clarified effluent liquid is discharged from the tank over an annular effluent weir at the outer circumference of the tank. A vertical annular filtering screen, which extends above the liquid level in the tank, is concentric with the circular effluent weir and has a diameter slightly less than the diameter of the effluent weir. The annular filter along with the outer wall of the tank and an annular shelf, which supports the filter define an annular effluent compartment, in communication with the effluent weir and into which no solid particles can enter unless they are minute enough to pass through the filter.

The heavier solid particles carried by the influent liquid settle to the bottom of the tank as the liquid moves from the center of the tank to the periphery, and are removed by a conventional sludge collecting rake, while the lighter solids which are suspended or floating on the liquid in the tank slowly migrate toward the perimeter of the tank along with the liquid in the tank. The liquid passes through the filter and subsequently over the effluent weir where it is removed from the tank, but the solids carried by the liquid are deposited on the annular filter as the liquid passes therethrough. To prevent a build up of the solids on the filter, the two sonic filter cleaners of the present invention are mounted at opposite ends of a horizontal beam or bridge that is diametrically positioned in the tank, each cleaner being disposed in a straddling manner over the upper edge of the cylindrical filter and mounted for movement along the filter so as to travel in a circular path around the clarification tank, removing particles from the filter as it moves along.

Each of the sonic filter cleaners comprises two spaced semi-cylindrical shrouds facing each other on opposite sides of the filter so that in combination they resemble a vertical cylinder with the filter passing in a curved vertical plane through the longitudinal centerline of the cylinder. Within the inner shroud is mounted at least one sonic transducer whose outer face pulsates at a sonic frequency sending sonic waves at the face of the filter. The sonic waves jar loose the solid particles, which are affixed to or caked on the face of the filter, so that they drop downwardly from the filter. A submersible pump is also disposed within the inner shroud and functions to pump the resultant slurry from within the shroud back into the clarification tank at the center thereof near the influent ports in the hollow center column. It has been found that some of the solid particles slip through or are driven through the filter by the transducer. To remove these solid particles another submersible pump is mounted in the outer shroud on the outside of the filter, and it functions to pump these solid particles from inside the outer shroud back into the clarification tank in the same manner as the pump disposed within the inner shroud. The shrouds help to confine the loosened solid particles so that they do not drift away from the pumps before they can be removed.

Accordingly, it is an object of the present invention to provide an improved clarification tank for clarifying solid-laden liquids.

Another object is to provide an improved filtering system to prevent the flow of solid particles out of the clarification tank along with the clarified liquid.

Another object is to provide an improved means for cleaning screen type filters.

Another object is to provide a sonic filter cleaning apparatus whereby sonic waves serve to jar solids loose from the filter.

Still another object is to provide a sonic filter cleaning apparatus which removes solids from the filter and then recaptures the solids for transfer away from the filter.

BRIEF DESCRIPTION OF THE DRAWINGS

FIG. 1 is a plan view of the liquid clarifying apparatus.

FIG. 2 is a side view of the liquid clarifying apparatus, partly in cross section and partly broken away, showing the rotating bridge and the sludge collecting rake in vertical alignment for purposes of clarity.

FIG. 3 is an enlarged fragmentary plan view of a segment of the clarification tank showing the filter cleaning apparatus, the view being taken along line 3—3 of FIG. 2.

FIG. 4 is a fragmentary sectional view taken substantially on line 4—4 of FIG. 3 showing the positioning of the elements of the filter cleaning apparatus and also showing the flow of solid particles which have been removed from the filter.

FIG. 5 is a reduced sectional view similar to that of FIG. 4 but including a segment of the outside tank wall and the motor means used to drive the bridge.

DESCRIPTION OF THE PREFERRED EMBODIMENT

As best seen in FIGS. 1 and 2, a circular clarifying tank 10 of the final settling tank variety, has a hollow center column 12, an outer circular wall 14 and a generally conical bottom wall 16 having a sludge discharge opening 18 partially surrounding the center column 12 near the low apex of the conical bottom wall and communicating with a sludge withdrawal conduit 19.

Influent solid bearing liquid is introduced into the tank 10 through an extension 20 of the hollow center column 12, and the influent is discharged through ports (not shown) near the top of the center column 12 slightly below the liquid level of the tank. The ports are circumferentially spaced around the center column so that uniform distribution of the influent liquid is effected. An influent baffle 22, surrounding the center column at the level of the discharge ports, serves to deflect the influent downwardly and further effects a uniform circumferential distribution thereof.

Independently and rotatably mounted on the center column 12 are a sludge collecting rake 24 and a supporting bridge 26. The sludge collecting rake 24 is conventional and consists of two diametrically opposed truss arms 28 inclined so as to conform to the conical bottom wall 16 of the clarifying tank 10. The arms 28 lie adjacent the bottom wall 16 and support a plurality of angled blades 30 whose circular paths of revolution are overlapping. The sludge collecting rake 24 is rotated very slowly, normally about 10 f.p.m. at its outer ends, and the blades 30 cooperatively rake settled sludge into the discharge opening 18 where it is removed from the tank through withdrawal conduit 19.

A circumferential effluent weir 32 is mounted on the outer wall 14 of the tank to define an effluent trough 34. The weir 32 is slightly lower than the liquid level L in the tank so that clarified liquid will flow uniformly over the weir at all points along the periphery of the weir and fall into the effluent trough 34. A discharge conduit 36 communicating with the effluent trough 34 serves as a drain for removal of the clarified effluent liquid from the tank.

A vertical filter medium 38 encircles the tank 10 a short distance inside the perimeter of the outer wall 14, dividing the tank into two concentric chambers, one for unclarified influent and the other for liquid that has been clarified. The filter medium in the disclosed embodiment is a screen made from woven wire cloth having a size range of 60 to 2600 mesh, but any filter material could be used without departing from the spirit of the invention. The filter medium 38 is supported by an annular shelf 40 so that the filter extends above and below the liquid level in the tank and in cooperation with the tank wall, defines an effluent compartment 42 into which no solid particles can migrate and from which the clarified liquid is removed from the tank over the effluent weir 32.

The rotating bridge 26 which supports the sonic filter cleaning apparatus in a manner to be discussed more fully below, is rotated about the center column 12 and is supported at its opposite ends by track engaging wheels 44. The wheels 44 follow along a circular track 46 on the top of outer wall 14, and one of the wheels is driven by a motor 48 at an adjustable rate. A variable speed collector motor 50 (FIG. 2), for driving the sludge collecting rake 24, is mounted on the underside of the bridge 26 near the center of the bridge and rotates with the bridge. The motor 50 is operably connected to a torque cage 52 which is in turn affixed to the truss arms 28 of the sludge collecting rake. The speed and direction of the collector motor 50 is adjusted in a conventional manner so that the sludge collecting rake is rotated in the same angular direction as the bridge 26 but at a reduced rate. Typical of the linear rates of the respective members would be approximately 30 f.p.m. for the bridge and 10 f.p.m. for the periphery of the sludge collecting rake.

The sonic filter cleaning mechanism generally designated 54 (FIG. 4) depends from the bridge and rotates with the bridge in a circular path around the tank. A separate sonic filter cleaning apparatus 54 is provided at each end of the bridge, and each is positioned over the filter medium 38 in a straddling manner. The cleaning mechanism 54 is best seen in FIGS. 3 to 5 and includes an inner semi-cylindrical shroud 56 (FIG. 3) and an outer semi-cylindrical shroud 57 depending from and affixed to the bridge 26, one disposed on either side of the filter medium 38, and in a facing relationship so that the cleaning mechanism resembles a split vertical cylinder with a portion of the filter medium 38 passing in a curved vertical plane through the longitudinal centerline of the cylinder. Each shroud is provided with a semi-circular solid bottom plate 59.

The shrouds 56 and 57 are spaced from the filter medium so that they do not brush against the filter causing undue wear to the filter. The spacing is maintained constant by horizontal rollers 58 on the bottoms of the shrouds which abut against and roll on a static circular filter supporting bracket 60 that circumscribes the tank directly beneath the filter. The bracket 60 serves as a roller guiding track as well as a brace and support for the filter.

Mounted within the inner shroud 56 on angle irons 62 is a sonic transducer mechanism 64 which may consist of any number of sonic transducers 66, for converting electrical energy into sonic waves. In the illustrated embodiment, three such transducers 66 are mounted within the shroud, but it is to be understood that any number of transducers could be utilized as long as they are effective in performing in accordance with the invention. Transducers, such as the Westinghouse unit, Model Magnatrak-1000 having a frequency of 22,000 cycles/second, can be used. The transducers emit sonic waves which are directed at the filter 38 so that solid particles caked on the filter are shaken loose from the filter by the pulsating high frequency waves and form a slurry within the shrouds 56 and 57.

Mounted within the outer shroud 57 on the opposite side of the filter from the transducer mechanism 64 and in direct alignment with the transducer mechanism is a reflector plate 68. The reflector plate is mounted on angle irons 69 so as to be rigid with the outer shroud. The reflector plate increases the effective sonic energy developed at the surface of the filter medium to enhance the cleaning capacity of the sonic cleaning mechanism by redirecting the waves toward the filter medium after they have passed therethrough. A careful spacing of the reflector plate 68 from the filter enables the oppositely directed waves, coming from the transducers and the reflector plate respectively, to augment each other at the surface of the filter in accordance with basic wave theory. That is, there is constructive interference observed at certain positions in the field energized by two or more sonic waves, those positions being where the waves are in phase. Therefore, if the reflector plate is spaced from the filter a distance such that waves reflected therefrom will be in phase with waves emanating from the transducers as they intersect at the surface of the filter, the energy of the separate interfering waves will be augmented at the filter surface and the filter cleaning capacity of the mechanism will be increased.

To quickly remove the slurry of loosened solid material from the vicinity of the filter medium and thus prevent a reattachment of the material to the filter, a submersible pump 70 is disposed within each shroud. The pumps 70 rest on support plates 72 and are secured to the shrouds by straps 74. Transfer conduits 76, connected to the pumps' upper discharge ends, are provided to direct the removed slurry back into the tank 10 near the influent discharge ports in the center column 12. The transfer conduits 76 are fastened to the bridge 26 and rotate with their discharge ends 77 submerged in the liquid within the influent baffle 22.

Power for the pumps 70 and transducers 64 is conventionally supplied through a current collector 78 at the top of the center column 12 which is connected through line 80 to an appropriate current generator.

In operation, influent solid bearing liquid is pumped into the clarification tank through the extension 20 of the center column 12 and distributed into the tank through the discharge ports near the top of the center column. The influent liquid is deflected downwardly by the influent baffle as it enters the tank 10 and then begins to migrate radially outwardly toward the effluent weir 32. The heavier solid particles carried by the influent liquid settle to the bottom of the tank and are raked into discharge opening 18 by the sludge collector 24 where they are removed permanently through withdrawal conduit 19. The lighter solids remain suspended in the liquid or float to the top.

To reach the effluent weir 32, the liquid must pass through the screen filter 38 which circumscribes the tank. As the liquid passes through the filter, the lighter solids, which are suspended in or floating on the surface of the liquid, are deposited on the filter and the clarified liquid enters the effluent compartment 42, whereupon it passes over the effluent weir 32 into the effluent trough 34 and thence out of the tank through drain 36.

It is evident that the screen filter must be constantly cleaned or the solid build-up on the filter will prevent the free passage of the liquid into the effluent compartment. Therefore, the sonic filter cleaners 54 are constantly rotated to keep the filter substantially free of caked solids. As the sonic filter cleaners are rotated with the bridge 26, the waves emitted from the sonic transducers 66 jar solid particles loose from the filter. The slurry of loosened solids particles is substantially confined within the shrouds 56 and 57 where it is easily picked up by the submersible pumps 70 and pumped back into the tank 10 for recycling along with the influent solid bearing liquid.

Although the best mode contemplated for carrying out the present invention has been herein shown and described, it will be apparent that modification and variation may be made without departing from what is regarded to be the subject matter of the invention.

I claim:

1. A liquid clarifying apparatus comprising a main tank, filter means projecting into the main tank for dividing the tank into chambers, one for unclarified influent and the other for liquid that has been clarified by passing through the filter, shroud means enclosing a restricted volume of liquid at the filter, filter vibrating and cleaning means for producing a slurry of filtrate and liquid within said shroud means, means for removing said slurry from within said restricted volume of liquid, means for introducing influent into the tank chamber containing unclarified influent, and means for withdrawing clarified effluent from the other tank chamber.

2. Apparatus according to claim 1 wherein said slurry removing means comprises pumping means at the lower end of the zone enclosed by said shroud.

3. A liquid clarifying apparatus comprising a main tank, filter means projecting into the main tank for dividing the tank into concentric chambers, one for unclarified influent and the other for liquid that has been clarified by passing through the filter, shroud means enclosing a restricted volume of liquid at the filter, filter vibrating and cleaning means for producing a slurry of filtrate and liquid within said shroud means, means for pumping said slurry from within said restricted volume of liquid, means for moving said mechanism around said filter, means for introducing influent into the tank chamber containing unclarified influent, and means for withdrawing clarified effluent from the other tank chamber.

4. The apparatus of claim 3, wherein said filter vibrating and cleaning means includes a sonic transducer.

5. The apparatus of claim 3, wherein said shroud means comprises facing shrouds for enclosing a restricted volume of liquid at both sides of the filter.

6. The apparatus of claim 5, wherein slurry pumping means are provided within the shrouds.

7. The apparatus of claim 1, wherein said filter vibrating and cleaning means includes a sonic transducer.

8. The apparatus of claim 7 wherein said filter is a cylindrical member and said sonic transducer is mounted for movement in a circular path close to one surface of said filter.

9. The apparatus of claim 1, wherein said sonic transducer is on the inner side of said filter, and the clarified effluent chamber is on the outer side.

10. The apparatus of claim 3 wherein, a shelf projects in from the tank wall and supports the filter.

11. The apparatus of claim 3 wherein, said filter means is a circular fine mesh screen.

12. The method of clarifying liquid such as sewage influent or the like comprising the steps of introducing unclarified solid bearing liquid into a settling tank, flowing the unclarified liquid through a filter, locally cleaning the solids from a portion of the filter to provide a slurry, confining and removing the slurry from the localized filter cleaning zone at both sides of the filter, and removing clarified liquid from the tank.

13. The method of claim 12 further including the step of progressively continuing said local filter cleaning and slurry removal along the extent of the filter.

References Cited

UNITED STATES PATENTS

| | | | |
|---|---|---|---|
| Re. 21,652 | 12/1940 | Thayer | 210—298X |
| 2,715,964 | 8/1955 | Martin | 210—265X |
| 3,489,679 | 1/1970 | Davidson et al. | 210—19 |

J. L. DE CESARE, Primary Examiner

U.S. Cl. X.R.

210—79, 298, 530